United States Patent [19]

D'Souza et al.

[11] 4,233,276
[45] Nov. 11, 1980

[54] PROCESS FOR THE DESULFURIZATION OF WASTE GASES

[75] Inventors: Gerard J. D'Souza, Glen Ellyn; Herschel D. Radford, Flossmoor, both of Ill.

[73] Assignee: Standard Oil Company (Indiana), Chicago, Ill.

[21] Appl. No.: 25,377

[22] Filed: Mar. 30, 1979

[51] Int. Cl.$^2$ ............................................. B01D 53/34
[52] U.S. Cl. ...................... 423/230; 423/224; 423/244; 423/539; 423/563; 423/573 G; 252/411 S; 208/120
[58] Field of Search ........... 423/224, 226, 230, 244 R, 423/244 A, 539, 563, 573.6, 574.6; 252/411 S; 208/120

[56] References Cited

U.S. PATENT DOCUMENTS

| | | | |
|---|---|---|---|
| 3,764,665 | 10/1973 | Groenendaal et al. | 423/244 R |
| 3,835,031 | 9/1974 | Bertolacini et al. | 423/244 A |
| 4,001,375 | 1/1977 | Longo | 423/244 R |
| 4,071,436 | 1/1978 | Blanton, Jr. et al. | 208/120 |
| 4,146,463 | 3/1979 | Radford et al. | 423/244 X |
| 4,153,534 | 5/1979 | Vasalos | 423/244 X |
| 4,153,535 | 5/1979 | Vasalos et al. | 423/244 X |

OTHER PUBLICATIONS

Lowell et al., "Selection at Metal Oxides for Removing SO$_2$ from Flue Gas", Ind. Eng. Chem. Process Des. Develop., vol. 10, No. 3, 1971, pp. 383-390.
Newell, "Making Sulphur from Flue Gas", Chemical Engineering Progress, vol. 65, No. 8, Aug. 1969, pp. 62-66.
Bienstock et al., "Bench Scale Investigation on Removing Sulfur Dioxide from Flue Gases", Journal Air Pollute Control Society, vol. 10, No. 2, Apr. 1960, pp. 121-125.

*Primary Examiner*—Earl C. Thomas
*Attorney, Agent, or Firm*—Lansing M. Hinrichs; William T. McClain; William H. Magidson

[57] ABSTRACT

A process for the removal of oxidizable sulfur compounds from a waste gas which comprises:
(a) mixing a waste gas containing compounds oxidizable to sulfur oxides with molecular oxygen and oxidizing said compounds to sulfur oxides;
(b) contacting the oxidized gas with a metal oxide absorbent capable of absorbing sulfur oxides at a temperature of between about 100° C. and 800° C., and absorbing sulfur oxides with said metal oxide absorbent;
(c) simultaneously, in the presence of a hydrocarbon cracking catalyst and at a temperature of between about 375° C. and about 1,200° C., cracking a hydrocarbon, regenerating the spent metal oxide absorbent and contacting the absorbent with steam to form hydrogen sulfide which can be separated from the cracked hydrocarbon and recovered as elemental sulfur.

7 Claims, 1 Drawing Figure

PROCESS FOR THE DESULFURIZATION OF WASTE GASES

BACKGROUND OF THE INVENTION

1. Field of the Invention

The instant invention pertains to a process for the removal of sulfur oxides and oxidizable sulfur compounds from a waste gas and comprises the steps of oxidizing the waste gas with molecular oxygen to convert the oxidizable sulfur compounds and elemental sulfur which may be present to sulfur dioxide or trioxide, absorbing the sulfur oxides with a metal oxide absorbent, and regenerating the metal oxide absorbent by contacting it with a hydrocarbon in the presence of a hydrocarbon cracking catalyst under conditions such that the absorbent is substantially converted to a sulfur-free state. During regeneration, the spent absorbent is reconverted to the original metal oxide, and the absorbed sulfur oxides are removed as hydrogen sulfide.

2. Prior Art

A major industrial problem involves the dvelopment of efficient methods for reducing the concentration of sulfur containing air pollutants, such as hydrogen sulfide and sulfur oxides, in the waste gas streams from a variety of processes. By way of example, the well-known Claus process for the conversion of hydrogen sulfide to elemental sulfur produces an effluent gas which may contain up to 2 or 3 percent by weight of sulfur compounds, substantial proportions of which are hydrogen sulfide, and sulfur dioxide. Although a variety of methods have been developed for the control of these emissions, the prior art methods have not been entirely satisfactory.

Four fundamental approaches have been suggested for the removal of sulfur oxides from a waste gas. One approach involves scrubbing the waste gas with an inexpensive alkaline material, such as lime or limestone, which reacts chemically with the sulfur oxides to give a non-volatile product which is discarded. Unfortunately, this approach requires a large and continual supply of the alkaline srubbing material, and the resulting reaction products can create a solid waste disposal problem of substantial magnitude.

A second approach to the control of sulfur oxide emissions has been to employ various catalysts to promote the oxidation of the sulfur dioxide in a waste gas stream to sulfur trioxide. This sulfur trioxide may then be utilized for the production of sulfuric acid.

A third approach to the removal of sulfur compounds from a waste gas exemplified by the SCOT, Beavan and Cleanair processes involves catalytic reduction of the sulfur compounds to hydrogen sulfide with hydrogen present in the waste gas or with supplemental hydrogen followed by selective absorption of the hydrogen sulfide.

A fourth approach to the removal of sulfur oxides from a waste gas involves the use of sulfur oxide absorbents which can be regenerated either thermally or chemically. The process of the subject invention is representative of this approach.

U.S. Pat. No. 4,001,375, J. M. Longo, discloses and claims a process for the removal of sulfur oxides from a gas. The process of this patent involves absorbing the sulfur oxides with cerium oxide followed by regenerating the spent cerium oxide through reaction with hydrogen gas. The regeneration step results in the production of a regeneration gas which contains a 1:1 ratio of hydrogen sulfide to sulfur dioxide. The patent does not, however, suggest that the spent cerium oxide could be regenerated by contact with a hydrocarbon in the presence of a hydrocarbon cracking catalyst to convert the absorbed sulfur oxides to hydrogen sulfide. Moreover, the process of this patent is not suitable for a waste gas containing hydrogen sulfide or other reduced forms of sulfur.

An article, entitled "Bench-Scale Investigation on Removing Sulfur Dioxide from Flue Gases," by Bienstock et al. in the Journal of the Air Pollution Control Associated, Vol. 10, No. 2, April 1960, pp. 121–125, discusses the ability of various metal oxides to absorb sulfur dioxide from a simulated flue gas at elevated temperatures. The article indicates that the spent metal oxides may be thermally regenerated and that reducing gases such as producer gas, hydrogen, and carbon monoxide are effective in lowering the temperature of regeneration. This article does not, however, suggest that a spent metal oxide absorbent could be regenerated by contacting it with a hydrocarbon in the presence of a hydrocarbon cracking catalyst.

An article, entitled "Making Sulphur from Flue Gas," by J. E. Newell in Chemical Engineering Progress (Vol. 65, No. 8) August 1969 proposes utilization of the Bienstock process to remove sulfur oxides from power station flue gases. Alkalized alumina is suggested as the absorbent and regeneration of the absorbent is effected by contacting it in a fluidized bed with the effluent gases from an autothermic reformer to which methane, steam and air is fed. The sulfur containing gas from the regenerator is sent to a Claus plant for sulfur recovery and the Claus tail gas is combusted with methane and air before being fed to the flue gas adsorber reactor. This article does not suggest that a spent metal oxide absorbent could be regenerated by contacting it with a hydrocarbon in the presence of a hydrocarbon cracking catalyst, nor does it suggest that a Claus tail gas may be oxidized in the presence of the cracking catalyst and the absorbent to react therewith.

A more recent article, entitled "Selection of Metal Oxides for Removing $SO_2$ from Flue Gas," by Lowell et al. in Ind. Eng. Chem. Process Des. Develop., Vol. 10, No. 3, 1971, is also addressed to the use of various metal oxides to absorb sulfur dioxide from flue gas. This article suggests that the absorbents should be regenerated thermally and does not discuss their regeneration under reducing conditions.

U.S. Pat. No. 4,071,436, W. A. Blanton, et al., discloses in one embodiment that sulfur oxides can be removed from various stack and tail gas streams including Claus plant tail gas by reacting the sulfur oxides with alumina contained in a particulate solid reactant and contacting the solid reactant with hydrocarbon to form hydrogen sulfide in a regeneration zone. The described embodiment does not make use of a hydrocarbon cracking catalyst in regeneration, does not utilize steam to form hydrogen sulfide and does not recycle the thus formed hydrogen sulfide to the Claus plant producing the tail gas.

The cyclic, fluidized, catalytic cracking of heavy petroleum fractions is one of the major refining operations involved in the conversion of crude petroleum oils to valuable products such as the fuels utilized in internal combustion engines. Such a process involves the cracking of a petroleum feedstock in a reaction zone through contact with fluidized solid particles of a cracking catalyst. Catalyst which is substantially deactivated by non-volatile coke deposits is then separated from the reaction zone effluent and stripped of volatile deposits in a stripping zone. The stripped catalyst particles are separated from the stripping zone effluent, regenerated in a regeneration zone by combustion of the coke with an oxygen containing gas, and the regenerated catalyst particles are returned to the reaction zone. In the application of this process to sulfur-containing feedstocks, catalyst is deactivated through the formation of sulfur-containing deposits of coke. In conventional processes, the combustion of this sulfur-containing coke results in the release of substantial amounts of sulfur oxides to the atmosphere. U.S. Pat. No. 3,835,031, R. J. Bertolacini et al., however, discloses a method for the reduction of these sulfur oxide emissions through the use of a molecular sieve type cracking catalyst which is impregnated with one or more Group IIA metal oxides. These metal oxides react with sulfur oxides in the regeneration zone to form non-volatile inorganic sulfur compounds. These non-volatile inorganic sulfur compounds are then converted to the starting metal oxides and hydrogen sulfide upon exposure to hydrocarbons and steam in the reaction and stripping zones of the cyclic cracking process unit. The disclosure of this patent does not, however, suggest that the sulfur oxides and oxidizable sulfur compounds contained in a waste gas, generated separately from catalyst regeneration, can be either controlled or eliminated by contacting the gas with a metal oxide modified cracking catalyst.

U.S. patent applications Ser. Nos. 748,555, I. A. Vasalos et al.; and 748,556, I. A. Vasalos, both assigned to Standard Oil Company (Indiana), now U.S. Pat. Nos. 4,153,535 and 4,153,534, respectively, disclose processes similar to that set forth in U.S. Pat. No. 3,835,031, which involve the removal of sulfur oxides from the regeneration zone flue gas of a cyclic, fluidized, catalytic cracking process through the use of a molecular sieve type cracking catalyst in combination with a regenerable metallic reactant which absorbs sulfur oxides in the regeneration zone and is converted back to starting material and hydrogen sulfide in the reaction and stripping zones of the cracking process. The disclosure of these applications is also limited to the removal of sulfur oxides from the regenerator effluent gas stream of a cyclic, fluidized, catalytic cracking process.

Our U.S. patent application Ser. No. 731,949, H. D. Radford et al., assigned to Standard Oil Company (Indiana), now U.S. Pat. No. 4,146,463 discloses a process in which a waste gas containing sulfur oxides and/or carbon monoxide is conveyed to the regeneration zone of a cyclic, fluidized, catalytic cracker and is there contacted with catalyst particles modified with a metal oxide which reacts with the sulfur oxides. The application does not suggest that a Claus plant tail gas in which hydrogen sulfide is the predominant sulfur compound would be susceptible to removal of sulfurr contaminants by contacting with cracking catalyst and a metal oxide absorbent. Moreover, the application does not suggest that the effluent gases containing hydrogen sulfide and organic sulfur compounds obtained when the catalyst and the absorbent are contacted with a hydrocarbon under cracking conditions may be recycled to the Claus plant, effectively to extinction.

SUMMARY OF THE INVENTION

The instant invention pertains to a process for the removal of sulfur oxides and oxidizable sulfur compounds from a waste gas preferably from a Claus plant and comprises the steps of oxidizing the waste gas with molecular oxygen to convert the oxidizable sulfur compounds and free sulfur to sulfur dioxide or sulfur trioxide, absorbing the sulfur oxides with a metal oxide absorbent, and regenerating the metal oxide absorbent by contacting it with a hydrocarbon in the presence of a hydrocarbon cracking catalyst under conditions such that the absorbent is substantially converted to a sulfur-free state. During regeneration, the spent absorbent is reconverted to the original metal oxide, and the absorbed sulfur oxides are converted to volatile sulfur compounds which may be recycled to a Claus plant. The regenerated absorbent and the cracking catalyst are recycled to the first zone, wherein coke formed from the cracking of the hydrocarbon is burned off providing a substantial portion of the heat to maintain both zones at the required reaction temperatures.

DETAILED DESCRIPTION OF THE INVENTION

Figure 1:
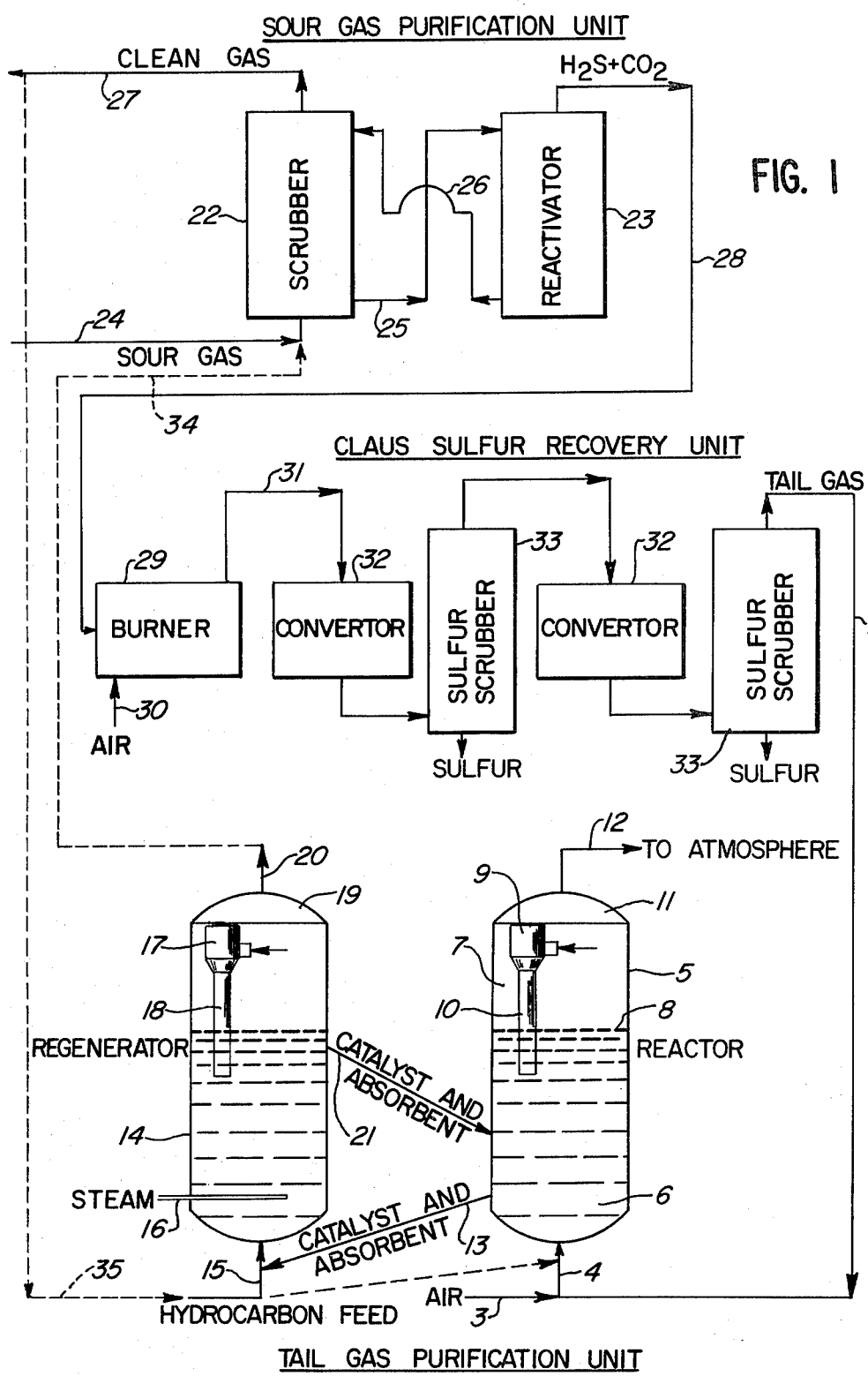

The invention is directed to an improved process for the removal of oxidizable sulfur compounds from a waste gas which process comprises:

(a) mixing a waste gas containing compounds oxidizable to sulfur oxides with molecular oxygen and oxidizing said compounds to sulfur oxides;

(b) contacting the oxidized gas with a metal oxide absorbent capable of absorbing sulfur oxides and selected from the group consisting of the oxides of sodium, potassium, lithium, magnesium, calcium, strontium, barium, scandium, titanium, chromium, iron, molybdenum, manganese, cobalt, nickel, antimony, copper, zinc, cadmium, lead, and the rare earth metals, at a temperature of between about 100° C. and 800° C., and absorbing sulfur oxides with said metal oxide absorbent;

(c) simultaneously, in the presence of a hydrocarbon cracking catalyst and at a temperature of between about 375° C. and about 1,200° C., cracking a hydrocarbon, regenerating the spent metal oxide absorbent and contacting the absorbent with steam to form hydrogen sulfide which can be separated from the cracked hydrocarbon and recovered as elemental sulfur.

The process of the subject invention is an efficient and economical method for the removal of minor amounts of sulfur oxides and oxidizable sulfur compounds, such as hydrogen sulfide, carbonyl sulfide, carbon disulfide and elemental sulfur from a waste gas stream. The process of the invention is particularly well suited for the removal of the sulfur compounds contained in the waste gas stream produced by a Claus plant and the process permits substantial recovery of the sulfur in the form of hydrogen sulfide which is preferably recycled to the Claus plant together with the feed and when this is done the noxious gases at the waste stream can be recycled virtually to extinction.

The sulfur-containing gas treated according to the process of the subject invention can contain gases such as nitrogen, rare gases such as argon, steam, carbon dioxide, oxygen and nitrogen oxides. Ordinarily, inert gases such as nitrogen and carbon dioxide will represent a major portion of the sulfur containing gas. Sulfur-free oxidizable material such as carbon monoxide, hydrogen, and volatile hydrocarbons can also be present in the sulfur-containing gas in from low to moderate amounts, and during the step wherein the gas is treated with sufficient molecular oxygen to convert substantially all of the oxidizable sulfur compounds to sulfur oxides the oxidizable materials will burn contributing a portion of the heat requirements. Preferably these sulfur-free oxidizable materials in a Claus plant waste gas represent less than about 20 volume percent, more preferably less than about 10 volume percent, and ideally less than about 6 volume percent of the sulfur-containing gas.

The subject invention is directed to an efficient and economical process for the removal of oxidizable sulfur compounds and minor amounts of sulfur oxides from a gas. The oxidizable sulfur compounds consist of any volatile sulfur compounds which can be oxidized to sulfur dioxide or sulfur trioxide upon treatment with a molecular oxygen containing gas at a suitable oxidation temperature. Most importantly, these oxidizable sulfur compounds consist of hydrogen sulfide and volatile organic compounds such as mercaptans of from 1 to 8 carbon atoms, disulfides of from 1 to 10 carbon atoms, carbonyl sulfide and carbon disulfide.

Although the process of the subject invention is applicable to any gas or gas stream which contains from low to moderate concentrations of up to 20 vol.% sulfur compounds such as sulfur oxides and oxidizable sulfur compounds, the invention is particularly well suited for the treatment of effluent gas from the "Claus" process. The "Claus" process which is described in Kirk-Othmer Encyclopedia of Chemical Technology—2nd Edition—Vol. 19 pages 353–354 which is hereby incorporated by reference, is normally itself a "clean-up" process wherein elemental sulfur is prepared by partial oxidation of hydrogen sulfide with an oxygen-containing gas to form sulfur dioxide, followed by the reaction of the sulfur dioxide with the remaining hydrogen sulfide in the presence of a catalyst to form elemental sulfur and water. The Claus process, which is frequently used for treatment of the hydrogen sulfide recovered from various gas streams, such as sour natural gas and sour refinery gas, is carried out by a plant which typically comprises a combustion chamber followed by one or more catalyst beds between which are arranged one or more condensers. The reaction products are cooled in the condensers and elemental sulfur is recovered from them in liquid form. Since the yield of elemental sulfur, relative to the hydrogen sulfide introduced, is not quantitative, a minor amount of unreacted hydrogen sulfide, carbonyl sulfide, carbon disulfide, sulfur dioxide and elemental sulfur vapor remains in the effluent gas stream from the Claus process unit. To some extent, the amount of elemental sulfur recovered in a Claus unit is dependent upon the number of catalyst beds employed. Ordinarily, however, a 98% recovery of the total available sulfur represents the maximum efficiency of a typical Claus unit. The composition of a Claus plant tail gas may vary considerably from time to time as it is very responsive to the amount of air supplied to the initial combustion chamber. If less than the stoichiometric amount of air is supplied hydrogen sulfide will be in considerable excess, and if excess air is supplied oxidized sulfur compounds may predominate. Normally, however, the predominant sulfur compound is hydrogen sulfide.

According to the process of the invention, the Claus unit waste gas stream is contacted in the presence of a cracking catalyst and absorbent with a sufficient amount of molecular oxygen to provide molecular oxygen in excess of the amount required for complete conversion of all the oxidizable sulfur compounds to sulfur dioxide or trioxide. Preferably, the excess of molecular oxygen is from about 0.1% to about 25% of the stoichiometric amount required for complete conversion of the oxidizable compounds to carbon dioxide, water and sulfur trioxide. The resulting mixture is then reacted to produce an oxidized gas wherein substantially all of the oxidizable sulfur compounds have been converted to sulfur dioxide or sulfur trioxide. Ideally, all of the oxidizable sulfur compounds and sulfur dioxide are oxidized to sulfur trioxide.

The source of molecular oxygen will usually be air but pure oxygen or other oxygen containing gases can be used.

The oxidized gas is contacted with at least one metal oxide absorbent which reacts with the sulfur oxides to form non-volatile inorganic sulfur compounds which are primarily sulfites and sulfates. As a consequence of this chemical reaction to form non-volatile inorganic sulfur compounds, the sulfur oxides in the oxidized gas are absorbed and rendered unavailable for release to the atmosphere. Suitable metal oxides include those selected from the group consisting of the oxides of sodium, potassium, lithium, magnesium, calcium, strontium, barium, scandium, titanium, chromium, iron, molybdenum, manganese, cobalt, nickel, antimony, copper, zinc, cadmium, lead, and the rare earth metals. The metal oxides are preferably selected from the group consisting of the oxides of sodium, calcium, and magnesium. More preferably, the metal oxides, are selected from the group consisting of sodium and magnesium. The metal oxide may be combined with a support. For example, alkalized alumina which is a coprecipitate of sodium and aluminum oxides is satisfactory.

The chemical reaction between metal oxide absorbent and sulfur oxides in the oxidized gas which results in the formation of non-volatile inorganic sulfur compounds, such as sulfites and sulfates, is reversible and may be summarized in a simplified manner by the following equations:

$$M_xO + SO_2 \rightleftharpoons M_xSO_3$$

$$M_xO + SO_3 \rightleftharpoons M_xSO_4$$

where x is the ratio of the oxidation state of the oxide ion to the oxidation state of the metal M of the metal oxide absorbent when combined with oxygen. At very high temperatures, these sulfites and sulfates undergo partial decomposition to liberate the original sulfur oxides and the metal oxide absorbent. As a result of the reversal of the sulfur oxide absorption reactions at high temperature, the absorbtion of sulfur oxides from the oxidized gas is ordinarily carried out at a temperature below about 900° C. Preferably, the metal oxide absorbent is contacted with the oxidized gas at a temperature of from about 100° C. to about 900° C., and more preferably at a temperature of from about 100° C. to about 700° C.

A preferred embodiment of the present invention involves contacting the sulfur containing gas with molecular oxygen in the presence of an oxidation promoter, which is preferably comprised of at least one free or combined metallic element selected from the group consisting of ruthenium, osmium, rhodium, silver, iridium, palladium, platinum, vanadium, and rubidium. More preferably, the oxidation promoter is selected from the group consisting of free or combined platinum and vanadium. The free metallic element, selected from these groups, or the oxides thereof are particularly suitable for use as the oxidation promoter. Vanadium pentoxide and platinum metal are especially useful as oxidation promoters. The oxidation promoter is utilized in sufficient amount to accelerate the conversion of sulfur dioxide to sulfur trioxide as the sulfur containing gas undergoes oxidation with molecular oxygen. Consequently, in this embodiment, it is particularly desirable to utilize molecular oxygen in excess of the amount required for complete conversion of the oxidizable sulfur compounds and sulfur dioxide in the gas undergoing treatment to sulfur trioxide.

Use of the oxidation promoter permits a more efficient removal of sulfur oxides from the oxidized gas stream that is otherwise possible in its absence, probably for the reason that metal sulfates are more stable that the corresponding sulfites. Although the disclosed process is not to be limited thereby, it is believed that the oxidation promoter serves to catalyze the conversion of sulfur dioxide to sulfur trioxide. This sulfur trioxide is then more effectively absorbed by the metal oxide absorbent than is the sulfur dioxide.

The spent metal oxide absorbent, which has been substantially converted to non-volatile inorganic sulfur compounds, is regenerated by contact with a hydrocarbon at an elevated temperature in the presence of a hydrocarbon cracking catalyst. Virtually any hydrocarbon can be utilized so long as it is crackable by the cracking catalyst under conditions prevailing in the regenerator. Preferably the hydrocarbon is selected from the group consisting of methane, natural gas, natural gas liquids, naphtha, or crude petroleum fraction. In cases where the Claus unit is operated in conjunction with an absorber and reactivator to purify sour natural gas or sour refinery gas streams, a convenient source the hydrocarbon can be either the clean gas emerging from the absorber or the sour gas feeding to the absorber. In such cases only a small fraction of the gas being treated is required. Preferably, the hydrocarbon is not used in excess of the amount required for substantially complete regeneration of the spent metal oxide absorbent, although larger amounts of hydrocarbon can also be employed.

The precise nature of the hydrocarbon cracking catalyst employed in the process of the present invention is unimportant provided that it has sufficient activity to crack the particular hydrocarbon utilized. Cracking catalysts which are unsuitable for use in the commercial catalytic cracking of petroleum feedstocks because of metals contamination are highly effective when utilized in the subject process. Suitable catalysts include acid treated clays, amorphous silica-alumina catalysts, molecular sieve containing cracking catalysts, spent equilibrium cracking catalysts, and desulfurization and resid catalyst containing alumina. Conventional silica-magnesia cracking catalysts are highly advantageous in that a suitable metal oxide absorbent is inherently present in the form of magnesia.

The spent metal oxide absorbent can be regenerated at a regeneration temperature of from about 375° C. to about 1,200° C., preferably from about 450° C. to about 800° C., and more preferably from about 450° C. to about 700° C., in the presence of the hydrocarbon and hydrocarbon cracking catalyst. The reaction and regeneration temperatures utilized in the process must, of course, be lower than that which will cause substantial thermal deactivation of the cracking catalyst. Consequently, acid treated clays cannot ordinarily be utilized at temperatures much above about 650° C., whereas many zeolite containing cracking catalysts can be employed at temperatures of 750° C. and above. By way of example, hydrocarbon cracking catalysts containing ultrastable zeolite Y are thermally stable at temperatures in excess of 1,000° C.

At regeneration temperatures, the combination of hydrocarbon and hydrocarbon cracking catalyst provides a reducing environment which permits converting the spent metal oxide absorbent to hydrogen sulfide while simultaneously regenerating active metal oxide absorbent. Although the process is not to be limited, it is believed that the non-volatile inorganic sulfur compounds, such as sulfites and sulfates, contained in the spent metal oxide absorbent are reduced to metal sulfides and water in the regeneration zone. These metal sulfides are then hydrolyzed to hydrogen sulfide by the water and regenerated metal oxide absorbent. In order to facilitate the hydrolysis of the intermediate metal sulfides, spent metal oxide absorbent can be regenerated in the presence of added steam. The regeneration of spent metal oxide absorbent can be summarized in a simplified manner by the following equations:

$$M_xSO_3 + 3H_2 \rightarrow M_xS + 3H_2O$$

$$M_xSO_4 \pm 4H_2 \rightarrow M_xS + 4H_2O$$

$$M_xS + H_2O \rightarrow M_xO + H_2S$$

where x is the ratio of the oxidation state of the oxide ion to the oxidation state of the metal M of the metal oxide when combined with oxygen.

The hydrogen sulfide produced during regeneration of the spent metal oxide absorbent is separated from the regeneration zone effluent gases and can be converted to elemental sulfur in conventional facilities. Ideally, the regeneration zone effluent can be fed to the absorber operating in conjunction with the Claus unit whose waste gas stream is being treated. Hydrocarbons contained in the regeneration zone effluent gases if separately treated to remove hydrogen sulfide can be recycled to the regeneration zone to extinction. Alternatively, the hydrocarbons contained in the regeneration zone effluent gases can be utilized as a fuel and burned to satisfy the heat requirements of the process.

The interaction of hydrocarbon with hydrocarbon cracking catalyst in the regeneration zone results in the deposit of some non-volatile carbonaceous material or coke on the catalyst particles as well as on the absorbent if separate from the catalyst particles. Coke comprises highly condensed aromatic hydrocarbons. As coke accumulates on the catalyst surfaces, the activity of the catalyst and its suitability for use in the process diminish. These deactivated catalyst particles are, however, reactivated to essentially their original capabilities by substantial removal of the coke deposits by burning the coke deposits from the catalyst surfaces with an oxygen containing gas such as air by conventional methods. In a preferred embodiment of the invention, coked cracking catalyst and the gas stream containing oxidizable sulfur compounds are simultaneously contacted with excess molecular oxygen in the presence of the metal oxide absorbent at a temperature from about 580° C. to about 800° C. in the absorber. Under these conditions, the coke undergoes combustion to provide at least a portion of the required process heat, the oxidizable sulfur compounds are converted to sulfur oxides, and the sulfur oxides are absorbed by the metal oxide absorbent. If additional process heat is required gaseous or liquid hydrocarbon fuel can be fed to the reactor.

Although an unsupported metal oxide absorbent can be used in the process of the present invention, the absorbent is preferably incorporated into or deposited onto a suitable support. Such support can be a hydrocarbon cracking catalyst or a refractory inorganic oxide such as silica, alumina, zirconia, thoria, boria, and calcined clay which is substantially inert as a hydrocarbon cracking catalyst. Silica, alumina, and mixtures of silica and alumina are particularly suitable supports. Desirably, the support is porous and frequently has a surface area, including the area of the pores open to the surface, of at least about 10 and preferably at least about 50 square meters per gram. The amount of metal oxide absorbent may be from about 0.1 to about 50 weight percent, preferably from about 0.5 to about 30 weight percent, based on the total weight of the absorbent and support.

The precise manner in which the metal oxide absorbent is incorporated into or deposited onto the hydrocarbon cracking catalyst or refractory inorganic oxide support is not known with certainty. The metal of the oxide absorbent may enter into a complex chemical combination with the support material. Therefore, it is understood that the use of the terms "metal oxide" and "incorporated into" or "deposited onto" a support connotes not only the free metal oxide absorbent but also includes the products of chemical reaction between the support material and the metal oxide absorbent.

The metal oxide absorbent can be combined with the support either during or after preparation of the support. One method of preparing the metal oxide absorbent for use in the invention consists of impregnating a suitable support with an aqueous or organic solution or dispersion of a compound or compounds of the metal or metals of the metal oxide absorbent. The impregnation may be practiced in any way which will not destroy the structure of the support. After drying, the composite can be calcined to afford the supported metal oxide absorbent of the invention. Preferably, water soluble nitrate salts are employed in the impregnating solution.

Another method of physically depositing the metal oxide adsorbent on a support, particularly porous substrates such as crystalline alumino-silicates, is adsorption of a fluid compound or compounds of the metal or metals of the metal oxide absorbent on the support followed by thermal or chemical decomposition of the compound or compounds. The support can be activated by heating to remove any adsorbed water prior to contact with a fluid compound or compounds of the metal or metals of the metal oxide absorbent. Suitable compounds include metal carbonyls, metal alkyls, volatile metal halides and the like. The adsorbed compound or compounds can then be converted thermally or chemically to the metal oxide absorbent. Thermal conversion, for example, can be effected by calcination or within the reactor vessel as catalyst is charged.

If the sulfur containing gas is contacted with molecular oxygen in the presence of an oxidation promoter, the oxidation promoter can be confined in a separate contacting zone in the form of a bar, mesh network, or screen, or as fluidizable solid particles which are enclosed within catalyst trays. Alternatively, the oxidation promoter can be admixed with the metal oxide absorbent. Although an unsupported oxidation promoter can be used in the process of the invention, the oxidation promoter is preferably incorporated into or deposited onto a suitable support. Those supports which can be utilized for the metal oxide absorbent are equally suitable for use with the oxidation promoter. It is particularly desirable to incorporate into or deposit onto the same support both the metal oxide absorbent and the oxidation promoter. In the event that both metal oxide absorbent and oxidation promoter are both supported on the same support, the amount of oxidation promoter may be from about 0.01 part per million to about 10 percent by weight based on the total weight.

The drawing is illustrative of the invention as applied to a continuous fluid bed process. Tail gas from a Claus sulfur recovery unit containing hydrogen sulfide, sulfur dioxide, carbonyl sulfide, and carbon disulfide flows through line 1 and is mixed with air which flows through line 3. The resulting mixture of air and tail gas flows through line 4 into the bottom of reactor 5 and discharges into a fluidized bed 6 of hydrocarbon cracking catalyst into which has been incorporated both the metal oxide absorbent and an oxidation promoter. The mixture of air and tail gas serves to fluidize the particles within the reactor. The hydrogen sulfide, carbonyl sulfide, and carbon disulfide contained in the tail gas are oxidized to sulfur oxides in the fluidized bed 6 within the reactor 5. Simultaneously, coke deposits on the hydrocarbon cracking catalyst and absorbent are removed by combustion through contact with the molecular oxygen in the fluidizing gas mixture. The oxidation promoter serves to promote the conversion of sulfur dioxide to sulfur trioxide within the fluidized bed 6. The resulting sulfur oxides are then removed by reaction with the metal oxide absorbent which is incorporated into the fluidized particles in fluidized bed 6. Desulfurized gas, together with entrained solid particles, flows upward into the dilute phase zone 7, which occupies the upper section of the reactor above the phase interface 8. Residual amounts of sulfur oxides are removed upon contact with entrained particles containing metal oxide absorbent in the dilute phase 7. The desulfurized gas together with entrained solid particles is withdrawn into cyclone separator 9. The solid particles are separated in the cyclone 9 and returned to the reactor vessel through line 10. Desulfurized gas then passes into plenum 11 and is discharged from the absorption vessel through line 12. Particles of hydrocarbon cracking catalyst containing spent metal oxide absorbent are withdrawn from the reactor through transfer line 13 and are conveyed to the regeneration vessel 14, together with hydrocarbon, through line 15. Spent metal oxide absorbent undergoes regeneration in the regeneration vessel 14 wherein the solid particles are maintained in a fluidized condition. Steam which hydrolyzes metal sulfides to hydrogen sulfide is introduced through line 16. Effluent from the regeneration vessel together with entrained solid particles are withdrawn into cyclone separator 17. Solid particles are separated in the cyclone and are returned to the regeneration vessel through line 18. Regeneration effluent then passes into plenum 19 and is discharged from the regeneration vessel through line 20. Hydrogen sulfide is then removed from the regeneration effluent by conventional means, such as amine scrubbing, and any remaining hydrocarbon or hydrogen may be either combusted or returned to the regeneration vessel together with natural gas through line 15. Regenerated catalyst is returned to the reactor through transfer line 21.

In its preferred embodiment the process of this invention is conducted in conjunction with a sour gas purification unit and a Claus sulfur recovery unit. The sour gas purification unit comprises a scrubber 22 and a reactivator 23 together with associated pumps, heat exchangers, and piping. Sour gas enters the scrubber through line 24 where it is scrubbed with an absorbent such as diethanolamine. The absorbent removes acid gases such as hydrogen sulfide and carbon dioxide and carries them to the reactivator 23 through line 25. In the reactivator the acid gases are stripped from the absorbent which is thereby regenerated and recycled through line 26 to the scrubber 22. Clean gas free of hydrogen sulfide and carbon dioxide emerges through line 27.

The acid gases from the reactivator are conducted through line 28 to the Claus unit burner 29 where they are partially burned in air supplied through line 30 to convert one-third of the sulfur present as $H_2S$ to $SO_2$. The burner effluent passes through line 31, a pair of catalytic converters 32 and sulfur scrubbers 33 in series. In the converters the sulfur forming reaction:

$$2H_2S + SO_2 \rightarrow 3S + 2H_2O$$

occurs and the thus produced sulfur is separated in the scrubbers 33. In the present invention the tail gas from the last scrubber 33 passes through line 1 to the reactor 5 of the tail gas purification unit as has been described. The hydrocarbon feed required for the regenerator 14 may be a minor portion of the sour gas from line 24 or preferably of the clean gas from line 27 in the sour gas purification unit. A dashed line indicated by 35 in the drawing indicates the path of the hydrocarbon from either of these sources to the feed line 15 of the regenerator 14. If desired a different source of hydrocarbon such as normally liquid hydrocarbon may be supplied to line 15. The gaseous effluent from the regenerator which contains hydrogen sulfide in combination with hydrogen, light hydrocarbons and steam is preferably conducted through line 34 to the sour gas inlet 24 of the scrubber 22. It is of course possible to utilize a separate scrubber rather than the main scrubber in the purification unit if pressure differences or distance from point to point so dictate but in most instances the arrangement described with recycle to the main scrubber is preferable.

It will be apparent that by operating the sour gas purification unit, the Claus sulfur recovery unit and the tail gas purification unit on an integrated basis, as has been described, that the sour gas feed is converted to clean gas and to sulfur with no objectionable emissions to the atmosphere and with maximum utilization of valuable components. All of the sulfur except for miniscule amounts which may be present in the effluent to the atmosphere from the reactor is recovered by recycling to extinction. Fuel values in the Claus tail gas including that of hydrogen sulfide are utilized in the reactor and the remaining heat required above that generated by burning of coke on the catalyst in the reactor to maintain the regenerator and reactor temperatures at required levels can be provided by the small fraction of the clean gas or the sour gas from the purification unit diverted through line 35. Moreover, the cracked products from the regenerator are recovered by recycle to the sour gas scrubber.

The process of this invention has been described with respect to a two vessel system (reactor 5 and regenerator 14) with catalyst transfer between the two vessels. It will be apparent to those familiar with the art that by providing appropriate piping connections and valves that the catalyst transfer can be eliminated and the process operated as a cyclic fixed bed process. In this mode of operation the absorption step is carried out in one vessel and the regeneration in the other until the absorbent has lost its activity to absorb the sulfur oxides. At this time the valves are actuated to interchange the flows to the two vessels and the regenerated absorbent in the opposite vessel takes over the absorbing function while the spent absorbent is regenerated in the first vessel.

The following Example is illustrative of the process of this invention without limitation on the scope thereof.

EXAMPLE

A Claus plant supplied with a sour gas stream containing 400 metric tons per day of sulfur and discharges a tail gas containing 12 metric tons per day of sulfur. The tail gas, which possesses the composition set forth in the Table as determined by mass spectrometer analysis, is conveyed to the bottom of a reactor of the type shown in the drawing where it is admixed with air.

Table

| Composition of Claus plant tail gas | |
|---|---|
| Component | Mole Percent |
| Hydrogen | 3.790 |
| Carbon dioxide | 8.390 |
| Carbon monoxide | 0.230 |
| Nitrogen | 84.785 |
| Oxygen | 0.860 |
| Argon | 1.313 |
| Hydrogen sulfide | 0.545 |
| Sulfur dioxide | 0.035 |
| Carbonyl sulfide | 0.016 |
| Carbon disulfide | 0.036 |

The reactor contains fluidizable particles of an equilibrium cracking catalyst which is treated so as to comprise ten percent sodium impregnated thereon to serve as a sulfur absorbent. DZ 5 fluid cracking catalyst of Davison Chemical Division, W. R. Grace & Company is satisfactory. The preferred impregnating solution is sodium nitrate. After impregnation and drying the catalyst is calcined in air at about 650° C. to decompose the salt to oxide form. The catalyst-absorbent particles are fluidized in the reactor by the flow of tail gas and air to afford a dense-phase bed which is maintained at a temperature of approximately 700° C. through combustion of the coke on absorbent and hydrocarbon fuel as required. The amount of air entering the reactor is adjusted to provide molecular oxygen in slight excess over the stoichiometric amount required to convert all of the combustible sulfur, carbon, and hydrogen containing materials within the regenerator to sulfur trioxide, carbon dioxide, and steam. Some absorbent is entrained in the fluidizing gases and is carried into the dilute-phase zone in the upper portion of the reactor above the interface with the dense bed. Gases and entrained absorbent are passed from the dilute-phase zone into a series of cyclone separators with absorbent being returned directly to the dense-phase zone. The gas stream leaving the cyclone system is passed first to a plenum area located at the top of the reactor and then discharged at approximately 700° C.

Absorbent containing 0.833 wt.% sulfur (2.5 wt.% as sulfate) is withdrawn from the dense-phase bed of the reactor, as required, through a transfer line and passed to the bottom of a regenerator of the type shown in the drawing as a light hydrocarbon stream is supplied at a rate of about 6,000 kilograms (13,230 pounds) per hour to the bottom of the regeneration vessel where it contacts the spent absorbent, to provide a dense-phase bed of fluidized particles at a temperature of about 550° C. Some of the absorbent undergoing regeneration is entrained in the fluidizing vapors and is carried into the dilute-phase catalyst zone in the upper portion of the regeneration vessel above the interface with the dense bed. The mixture of vapors and entrained absorbent is fed into a cyclone separator with absorbent being returned to the dense bed. The regeneration zone vapors, comprising hydrocarbon products and hydrogen sulfide, are passed from the cyclone to a plenum area and then to a conventional amine scrubbing facility which is preferably a part of the Claus plant creating the tail gas for separation of the hydrogen sulfide from the hydrocarbon products. Regenerated absorbent particles, containing about 0.9 wt.% coke which is deposited during regeneration, are returned as required to the absorption vessel for further use. Absorbent particles are circulated between the regeneration and absorption vessels at a rate of about 60 metric tons per hour. The effluent gas from the absorption vessel contains 0.0 vol.% carbon monoxide, 1.9 vol.% oxygen, and less than 250 ppm of sulfur oxides. Over 90% of the sulfur contained in the Claus plant tail gas is removed upon passage through the reactor.

We claim:

1. A process for the removal of oxidizable sulfur compounds from a waste gas which process comprises:
   (a) mixing a waste gas containing compounds oxidizable to sulfur oxides with molecular oxygen and oxidizing said compounds to sulfur oxides;
   (b) contacting said waste gas with a metal oxide absorbent capable of absorbing sulfur oxides, at a temperature of between about 100° C. and 800° C., and absorbing sulfur oxides with said metal oxide absorbent;
   (c) simultaneously, in the presence of a hydrocarbon cracking catalyst and at a temperature of between about 375° C. and about 1,200° C., cracking a hydrocarbon, regenerating the spent metal oxide absorbent; and contacting the absorbent with steam to form hydrogen sulfide and separating the hydrogen sulfide from cracked hydrocarbon products.

2. The process as set forth in claim 1 wherein said metal oxide absorbent is selected from the group consisting of the oxides of sodium, potassium, lithium, magnesium, calcium, strontium, barium, scandium, titanium, chromium, iron, molybdenum, manganese, cobalt, nickel, antimony, copper, zinc, cadmium, lead, and the rare earth metals.

3. The process as set forth in claim 1 wherein the waste gas undergoing processing is the tail gas from a Claus sulfur recovery plant and the hydrogen sulfide separated from the cracked hydrocarbon products is recycled to said Claus sulfur recovery plant.

4. The process as set forth in claim 1 wherein the amount of molecular oxygen mixed with the waste gas is in excess of the stoichiometric amount for the complete conversion of all of the oxidizable compounds in said waste gas to carbon dioxide, water and sulfur trioxide.

5. The process as set forth in claim 4 wherein the oxidation of the oxidizable sulfur compounds in the waste gas stream is carried out in the presence of an oxidation promoter.

6. The process as set forth in claim 5 wherein the oxidation promoter is selected from the group consisting of ruthenium, osmium, rhodium, silver, iridium, palladium, platinum, vanadium and molybdenum.

7. A process for removing sulfur pollutants from a gas stream having hydrogen sulfide as its principal sulfur containing constituent, which process comprises:
   (a) introducing said stream into a first zone together with molecular oxygen in an amount sufficient to oxidize the sulfur containing constituents of said stream to sulfur oxides;
   (b) in said first zone contacting said stream and molecular oxygen with a hydrocarbon cracking catalyst having associated therewith a metal oxide absorbent capable of absorbing sulfur oxides and absorbing sulfur oxides with said absorbent;
   (c) in a second zone contacting said hydrocarbon cracking catalyst and absorbent with a hydrocarbon vapor at an elevated temperature to crack the hydrocarbon and convert the absorbed sulfur constituents to inorganic sulfur compounds;
   (d) introducing steam into said second zone to hydrolyze said inorganic sulfur compounds to hydrogen sulfide;
   (e) separating the thus formed hydrogen sulfide and converting a major proportion thereof to elemental sulfur; and
   (f) recycling the unconverted hydrogen sulfide to said first zone.

* * * * *